United States Patent [19]

Willinger

[11] 4,283,820
[45] Aug. 18, 1981

[54] SEGMENT-SHAPED BLADE

[75] Inventor: Karl Willinger, Vienna, Austria

[73] Assignee: Miba Sintermetall Aktiengesellschaft, Laakirchen, Austria

[21] Appl. No.: 94,071

[22] Filed: Nov. 14, 1979

[51] Int. Cl.³ ............................................. B23D 71/00
[52] U.S. Cl. .................................... 29/79; 76/101 SM
[58] Field of Search ................. 29/78, 79; 76/101 SM; 83/835; 157/13

[56] References Cited

U.S. PATENT DOCUMENTS

| | | | |
|---|---|---|---|
| 2,896,309 | 7/1959 | Jensen | 29/79 |
| 2,975,504 | 3/1961 | Beutham | 29/78 |
| 3,102,325 | 9/1963 | Hemmefer | 29/79 |
| 3,351,997 | 11/1967 | Neilsen | 29/79 |
| 3,680,185 | 8/1972 | Wood | 29/79 |

FOREIGN PATENT DOCUMENTS 1300102 12/1972 United Kingdom .................. 29/79

Primary Examiner—Harrison L. Hinson
Attorney, Agent, or Firm—Kurt Kelman

[57] ABSTRACT

A segment-shaped blade is provided for use in a rotatable cylindrical tool for machining elastic material, particularly pneumatic rubber tires for vehicles. The blade comprises pointed triangular teeth, which are provided on a convex periphery and are staggered and divided by radial cuts. Each radial cut extends only as far as to the root of the tooth concerned and each triangular tooth is divided by one or more radial cuts into at least two triangular prongs which have pointed tips that are much more slender than the pointed tip of the original tooth.

4 Claims, 7 Drawing Figures

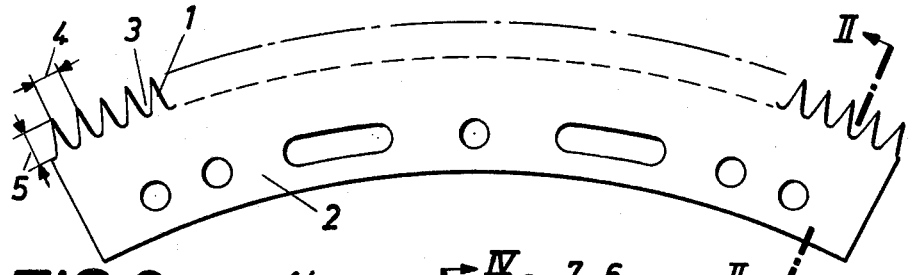
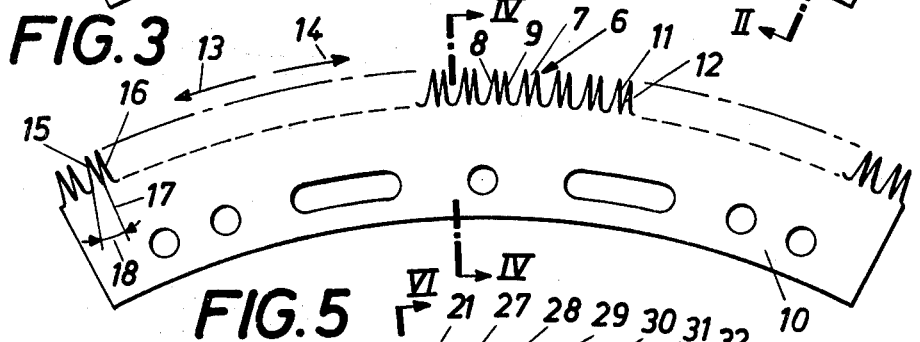
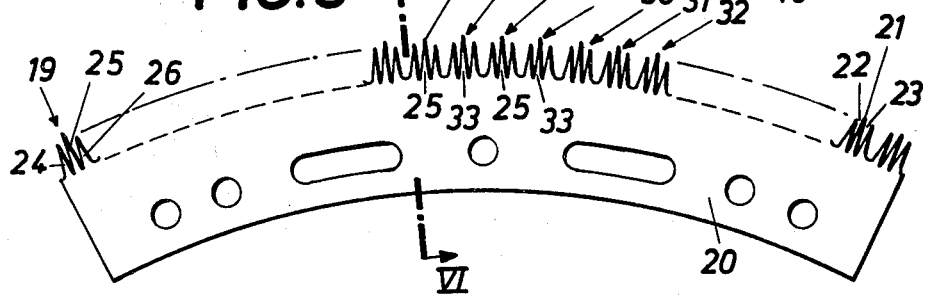
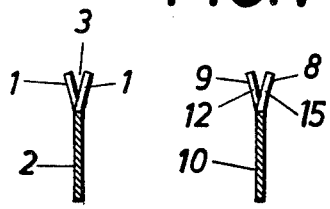
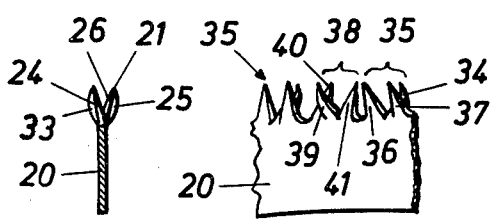

SEGMENT-SHAPED BLADE

This invention relates to a segment-shaped blade for use in a rotatable cylindrical tool for machining elastic material, particularly pneumatic rubber tires for vehicles, comprising pointed triangular teeth, which are provided on a convex periphery and are staggered and divided by radial cuts.

U.S. Pat. No. 2,975,504 discloses such a blade, in which said radial cuts extend below the roots of the teeth so that the latter are M-shaped and have double prongs and a strong root. This is intended to ensure that a breaking out of individual teeth is prevented with high safety. Another blade known from that patent has triangular teeth, which are not slit but are laterally bent to different sides of the blade in alternation.

Tire rasps provided with the known blades having M-shaped or triangular teeth are thus available for roughening the rubber covering of worn vehicle tires to be retreaded. Whereas the set teeth can engage the tire in a very large width so that the surface of the tire can be effectively roughened, these teeth can be used to provide only a very coarse roughened pattern.

It is known to use also roughening members set with needles to roughen the side walls of a pneumatic tire which is to be retreaded. To ensure that the cords lying on the side walls of the tire only under a thin rubber layer will not be damaged, it is known to use tools provided with wire brushes. Whereas such tools ensure a fine roughening of the rubber layer, they cannot always be used to full advantage because the bristles are bent down after a relatively short time. An unusually strong development of heat has even resulted in a burning of the tire.

Finally, steel discs provided with tungsten carbide splinters anchored at the periphery of the disc have also been used to roughen the side walls of the tires. In that case, a high contact pressure is required and gives rise to an undesirably high operating temperature.

It is an object of the invention so to design the blade which has been described first hereinbefore that its teeth can be used like the known wire brushes for a fine roughening of the rubber layer on the side walls of a pneumatic tire whereas a high operating temperature can be avoided. In the blade described, that object is accomplished according to the invention primarily in that each radial cut extends only as far as to the root of the tooth concerned and that each triangular tooth is divided by one or more radial cuts into at least two triangular prongs which have pointed tips that are much more slender than the pointed tip of the original tooth.

Because the radial cuts in the triangular teeth of such blade extend only as far as to the roots of the teeth, each tooth has at least two prongs, the pointed tips of which when used to roughen the surface of the rubber tire act like the above-mentioned needles and brushes so that the resulting roughened pattern is fine and particularly favourable for the vulcanization of the raw tread to be applied. Nevertheless, the operating temperature remains so low that the previously feared burning is entirely avoided.

Another advantage of the blade according to the invention resides in its relatively long edge life. This is due to the fact that the prongs resulting from the radial cuts are much more pointed than the known triangular teeth so that they can be worn to much larger depth because they are smaller in cross-section. Finally, the blade according to the invention has virtually a double working capacity because it has at least twice the number of pointed tooth tips of the conventional blade.

In a preferred embodiment of the invention, the prongs of a tooth are equal in size and are bent out of the plane of the blade to different sides, in known manner, or one prong lies in the plane of the blade and the other prong is bent out of the plane of the blade. Obviously, the manufacture of such blades is not more complicated than the manufacture of blades having wide triangular teeth because the individual teeth can be divided by an ordinary cutting tool and it is not necessary to bend all prongs out of the plane of the blade.

In another preferred embodiment of the invention, a wide-root triangular tooth is provided with one or two radial cuts before and behind its pointed tip, the long middle prong is offset to one side of the plane of the blade, the short other prongs are bent to the other side of the plane of the blade or lie in the plane of the blade, and all tooth points terminate in an imaginary arcuate plane. In a wide-root triangular tooth divided into three prongs, the stronger middle prongs has the strongest action to remove material and the two other prongs, which are weaker, ensure a particularly fine roughening of the rubber material to be machined. If a tooth is divided into more parts, i.e., into four or five prongs, the blade will act like a wire brush in that the rubber layer or the tire will be finely roughened whereas large rubber particles will not be removed and high operating temperatures will not arise.

Some illustrative embodiments of the invention are diagrammatically shown on the accompanying drawing, in which FIG. 1 is a side elevation showing a conventional blade, FIG. 2 is a sectional view taken on line II—II in FIG. 1, FIG. 3 a side elevation showing an embodiment of the blade according to the invention, FIG. 4 a sectional view taken on line IV—IV in FIG. 3, FIG. 5 a side elevation showing another embodiment of a blade according to the invention, FIG. 6 a sectional view taken on line VI—VI in FIG. 5 and FIG. 7 a perspective view, partly broken away, showing the blade according to the invention as illustrated in FIG. 5.

It is apparent from FIG. 1 that the conventional blades 2 are segment-shaped and on their convex outer edge are provided with triangular teeth 1, which are separated by peripheral recesses 3 so that the spacing 4 between the tips of teeth 1 is approximately as large as the height 5 of the teeth. As is shown in FIG. 2, the teeth 1 of blade 2 are bent out of the plane of the blade in alternation.

The invention is based on the tooth shape shown in FIGS. 1 and 2 and in accordance with FIG. 3 triangular tooth 6 is divided by an approximately radial cut 7 into two prongs 8 and 9, radial cut 7 extending no farther than the root of the tooth. In accordance with FIG. 4, prong 8 is bent to the left and prong 9 is bent to the right out of the plane of the blade 10.

Depending on the direction 13 or 14 in which the blade is moved, the leading edges 11 and 12 defining the radial cut 7 have a particularly strong action to remove material. That action will be stronger in any case than the action of the trailing edges 15 and 16 which include an angle 18 with the radial plane 17.

It is readily apparent from FIG. 3 that, owing to the division of the teeth, the number of the pointed tips of the teeth 6 of blade 10 is twice the number of the pointed tips of the teeth 1 of blade 2 so that the blade 10 can give twice the output in practice.

Owing to the above-mentioned strong action of the prongs 8, 9 of teeth 6, the pressure applied by a cylindrical tool carrying such blades 10 to the material being machined can be greatly reduced so that a very fine roughened surface pattern will be obtained on rubber material which has been machined and the operating temperature remains so low that a burning of the rubber material being machined will be reliably avoided.

Besides, the comparable tooth cross-sections of the teeth 6 and 1 differ at any given height so that the teeth 6 of blade 10 shown in FIG. 3 can be worn to a much larger depth, i.e., for a longer time, before they are blunt and can no longer be used. As a result, the blade 10 has a much longer life than the conventional blade 2 in FIG. 1.

In the embodiment of FIGS. 5 to 7, each tooth 19 of blade 20 is divided into three prongs 24, 25, 26 by two radial cuts 22, 23 disposed before and behind the pointed tip 21 of the tooth and extending only as far as the root of the tooth. As is shown in FIG. 6, the relatively thick middle prongs 25 is offset to one side of the plane of the blade 20 and the two other tooth portions 24, 26, which are shorter, are merely bent to the other side of the plane of the blade.

FIG. 6 shows the offset middle prongs 25 of the tooth 28 as well as the middle prongs 33 of the following tooth 29, which prongs is offset to the opposite side. The position of the teeth is particularly clearly apparent from FIG. 7, in which the blade 20 is shown in perspective. The middle prongs 34 of the tooth 35 is offset to the right side of the plane of the blade 20 and the two tooth portions 36, 37 of the tooth are bent to the left side of the plane of the blade. This relationship is inverted in the next following tooth 38, in which the middle prongs 39 is offset to the left of the plane of the blade 20 i.e. on the side opposite to the offset prongs 34 of the preceding tooth 35, and the two shorter prongs 40, 41 are bent to the right side of the plane of the blade, i.e., to the side which is opposite to the prongs 36, 37 of tooth 35 which are bent to the left.

The invention is not restricted to the embodiments shown by way of example. The prongs 36, 37 and 40, 41 may lie in the plane of the blade 20 or one of the shorter prongs of each tooth may remain in the plane of the blade whereas the other shorter tooth portions are bent. The pointed tips of all these prongs 34 to 41 lie in an imaginary common plane, which is curved in accordance with the segment-shaped blade, so that the prongs act at the same time. The middle prongs of each tooth 35, 38 of the blade 20 is stronger in most cases and removes the largest amount of material. The two other prongs 36, 37, 40, 41, which are weaker, ensure that the rubber material to be machined will be finely roughened.

If the blade embodying the invention is provided with a triangular tooth which has a particularly wide root, such tooth may be divided into four or five parts. In that case the several prongs are so offset or bent relative to each other that their pointed tips lie in a single curved plane and a single blade according to the invention has pointed tooth tips equal in number to the bristles of the steel brushes previously employed.

As has been mentioned, a triangular tooth can be divided by radial cuts. If one radial cut extends through the pointed tip of the triangular tooth, the cuts on the left and right of the radial cut may either be parallel thereto or may also extend in a radial direction.

The embodiments of the invention in which an exclusive property or privilege is claimed are defined as follows:

1. A segment-shaped blade for use in a cylindrical tool for machining elastic material by rotating the tool in a direction of rotation, the blade extending in a plane and having a convex periphery extending in a curved plane perpendicular to the plane of the blade, which comprises a plurality of triangular teeth arranged along the periphery between peripheral recesses, each triangular tooth having a root in another curved plane inwardly spaced from, and substantially parallel to, the curved plane wherein the periphery of the blade extends, and each tooth being divided by a substantially radial cut extending no farther than the root of the tooth into prongs having pointed tips, at least alternating ones of the prongs being bent to a side of the plane of the blade and the pointed tips of all prongs lying in the curved plane wherein the periphery of the blade extends and laterally staggered from each other in relation to the plane of the blade.

2. The segment-shaped blade of claim 1, wherein the alternating prongs are bent to different sides of the plane of the blade.

3. The segment-shaped blade of claim 1 or 2, wherein each tooth is divided by a single one of the cuts into two of said prongs, the triangular tooth having a plane of symmetry and the single cut extending in the plane of symmetry.

4. The segment-shaped blade of claim 1 or 2, wherein the teeth have a plane of symmetry and a like number of said cuts at each side of the plane of symmetry divide each tooth into a plurality of said prongs, the prongs having different heights and longers ones of the prongs being offset to a side of the plane of the blade so that the pointed tips of all prongs lie in the curved plane wherein the periphery of the blade extends.

* * * * *